A. B. McCORD.
VEHICLE DRIVING MECHANISM.
APPLICATION FILED JAN. 15, 1915.
1,181,233.
Patented May 2, 1916.
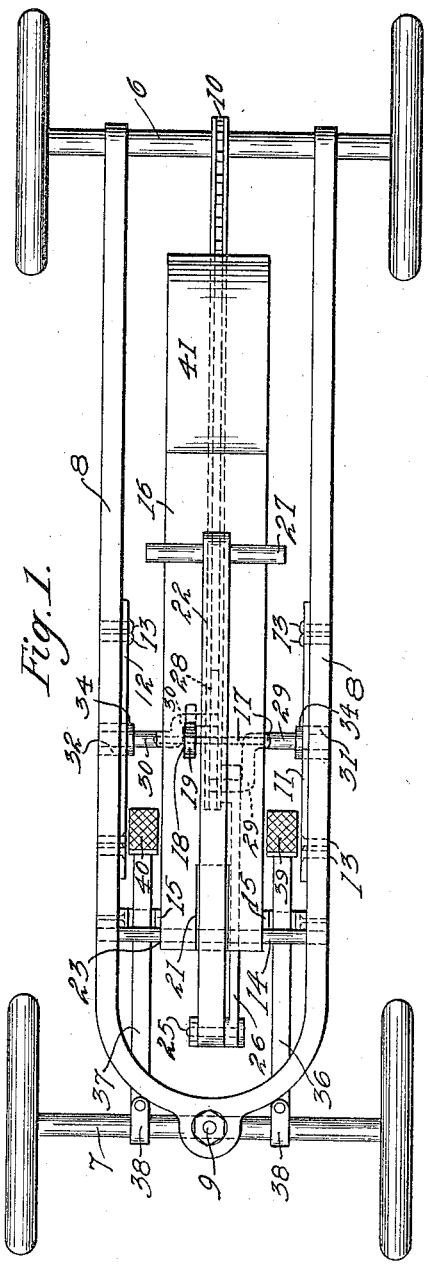
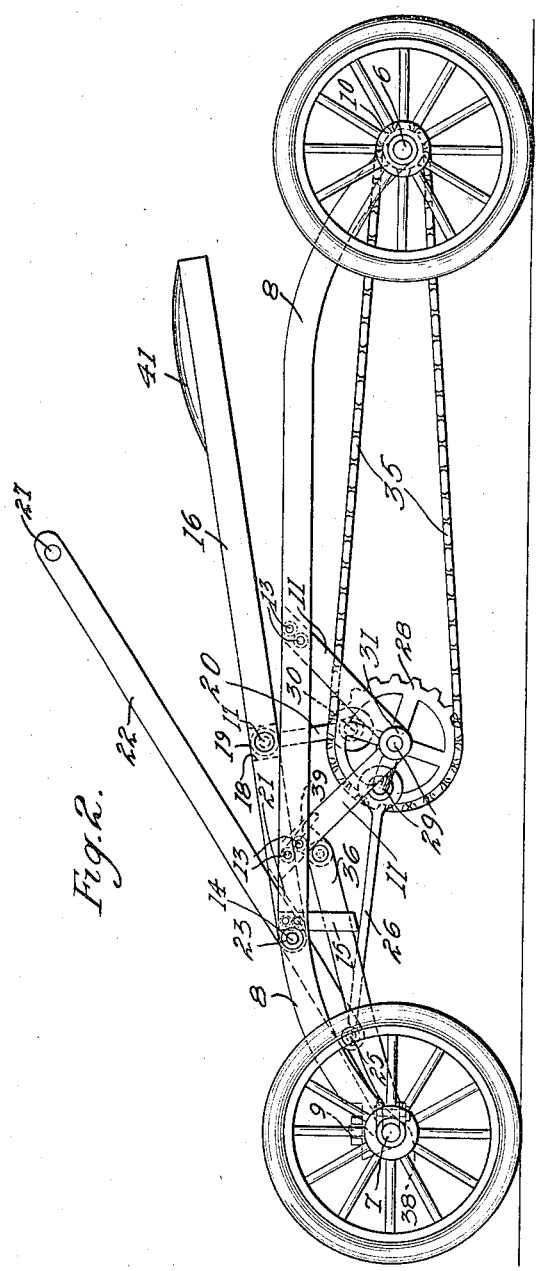
Witnesses
Paul A. Viersen
C Richard Betts
Inventor
Arthur B. McCord
By Clarence W. Taylor
Atty.

UNITED STATES PATENT OFFICE.

ARTHUR B. McCORD, OF OAK PARK, ILLINOIS, ASSIGNOR, BY MESNE ASSIGNMENTS, TO KANGAROO MANUFACTURING CO., A CORPORATION OF ILLINOIS.

VEHICLE DRIVING MECHANISM.

1,181,233.     Specification of Letters Patent.      Patented May 2, 1916.

Application filed January 15, 1915. Serial No. 2,320.

*To all whom it may concern:*

Be it known that I, ARTHUR B. MCCORD, a citizen of the United States of America, residing at Oak Park, in the county of Cook and State of Illinois, have invented certain new and useful Improvements in Vehicle Driving Mechanism, of which the following is a specification.

My invention relates to improvements in vehicles, particularly those manually operable; and the objects of my improvement are, first, to provide a construction simple, powerful, easily controlled and rapid in operation; second, to afford mechanism of the class hereinafter described in which the rear end of the seat for the operator travels through an arc of a circle moving the body as on horseback; third, to produce devices whereby the weight of the operator is employed for braking purposes and especially in an emergency; and, fourth, the provision of a structure in which there is no "dead center" in operation.

With the above and other objects in view, my invention consists in the novel features and in the novel combination and arrangement of parts hereinafter fully described, illustrated in the accompanying drawings forming a part of this specification, and particularly pointed out in the claims hereunto appended, it being understood that changes, variations and modifications in the details of the invention within the scope of the claims, may be resorted to without departing from the spirit or sacrificing any of the advantages thereof.

Figure 1 is a top plan view of an assembled vehicle. Fig. 2 is a side elevation of the vehicle.

Like numerals refer to like parts throughout the several views.

One embodiment of my invention is described as follows: A rear axle 6, a front axle 7 and a suitable frame 8, preferably of steel, are pivoted together at 9, and are adapted to sustain the associated mechanism for operation of the vehicle. The rear axle 6 has fixed thereto a sprocket wheel 10. Intermediate the ends of the frame 8 there are provided two-piece brackets 11, 12, which at their upper ends are suitably secured to the side rails of the frame 8 by rivets 13. The cross-rod 14 serves as a pivot for the front end of a traveling seat 16 hereinafter described, and is a fulcrum for the hand lever 22. A cross-bar 15 is suitably fixed to the frame and depends therefrom and is adapted to support the steering arms 36, 37.

I have provided what is termed a traveling seat 16 pivoted or hinged at one end with its free end movable through an arc of a circle. The seat is apertured transversely to receive the pin 17 and is slotted at 18 to receive the end 19 of the connecting rod or pitman 20. The seat is also slotted at 21 to permit greater movement of the hand lever 22, which is apertured transversely at 23 to receive the fulcrum rod 14. The lower end of the lever 22 is apertured to receive the pin 25, which extends through one end of the connecting rod or pitman 26. The upper end of the lever 22 is provided with a hand hold 27. The sprocket wheel 28 and cranks 29, 30, constitute a crank shaft. Obviously a crank shaft with other suitable means connected therewith to transmit motion may be employed, and, therefore, I do not limit my invention to the specific details shown and described. The crank 29 carries one end of the connecting rod 26 and the crank 30 is in operative engagement with connecting rod 20, and these cranks have their bearings 31, 32, in the apertured lower ends of the two-piece brackets 11, 12. Collars 34 are placed on the shaft ends of the crank.

The numeral 35 designates a sprocket chain.

The cranks 29, 30, are positioned approximately 90° apart.

Steering arms 36, 37, are pivoted to the front axle by clips 38 or other desired means and pedals 39, 40, are pivoted to the rear ends of the arms 36, 37.

The numeral 41 denotes a cushion.

An operator's seat movable at one end through an arc of a circle is an important feature of my present invention. It affords a movement of the rider somewhat like that of riding on horseback, particularly when the horse's motion is a gallop.

Having thus fully described my invention, what I claim as new and desire to secure by Letters Patent, is:

1. In mechanism of the class described, in combination, a frame adapted to sustain the associated mechanism, an operator's seat hinged at one end and the other end movable through an arc of a circle, a hand lever, a crank 29, a connecting rod 26 between said crank and the hand lever, a connecting rod 20 between the seat and the crank 30, and means substantially as set forth to transmit motion to the rear axle of the vehicle.

2. In a mechanism of the class described, the combination of a frame adapted to sustain the associated mechanism, an operator's seat movable through an arc of a circle, and a hand lever operating on a fulcrum, and a shaft having a plurality of cranks, the seat having a connecting rod 20 in operative engagement with crank 30 and the hand lever having a connecting rod 26 in operative relation to the crank 29.

3. A vehicle having operating mechanism comprising a traveling seat and a hand lever, a sprocket wheel having a plurality of cranks, a connecting rod pivoted to one end of the hand lever and in operative relation at the other end with one of said cranks and a connecting rod pivoted to the seat and in operative relation with the other of said cranks, and means to transmit motion to the rear axle of the vehicle.

4. In a vehicle of the class described, the combination of a frame work pivoted to the front axle, a sprocket wheel carrying a plurality of cranks each journaled on the frame, a traveling seat operatively connected with one of the cranks, a hand lever fulcrumed at one end and in operative relation with the other of said cranks, and means to transmit motion from the sprocket wheel to the rear axle.

5. In a vehicle of the class described, the combination with a frame, of a traveling seat pivoted at one end, a fulcrumed hand lever, a crank shaft, a connecting rod 26 between crank 29 and the hand lever, and a connecting rod 20 between the seat and the crank 30.

6. In a vehicle of the class described, the combination with a frame, of a traveling seat pivoted at one end, a fulcrumed hand lever, a crank shaft, a connecting rod 26 between crank 29 and the hand lever, and a connecting rod 20 between the seat and the crank 30, and suitable means to transmit motion to the driving axle.

In testimony whereof I affix my signature in presence of two witnesses.

ARTHUR B. McCORD.

Witnesses:
C. RICHARD BETTS,
SCOTT M. HOGAN.

Copies of this patent may be obtained for five cents each, by addressing the "Commissioner of Patents, Washington, D. C."